July 31, 1956 E. T. YOUNG 2,756,511
WELL SURVEYING INSTRUMENT
Filed Dec. 7, 1951 5 Sheets-Sheet 1
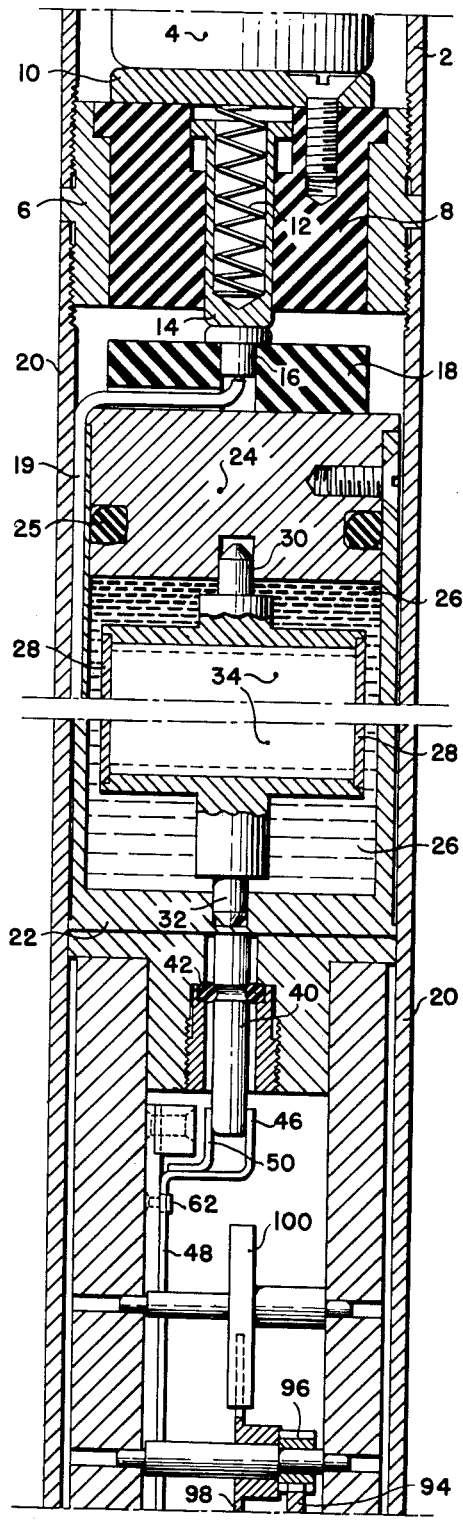
FIG. IA.
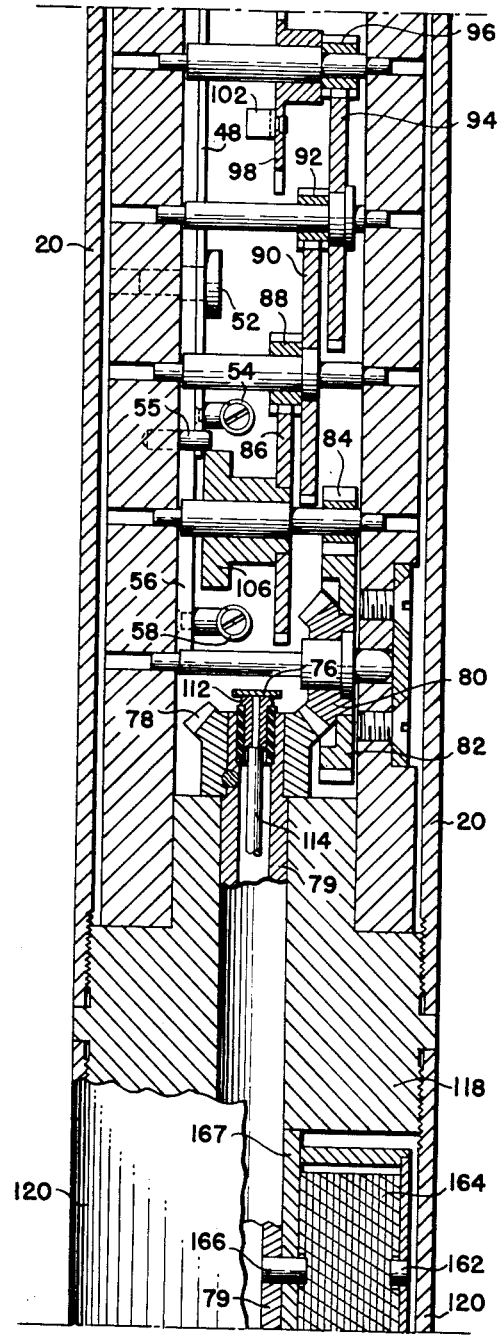
FIG. IB.
INVENTOR.
EINAR T. YOUNG
BY
ATTORNEYS.

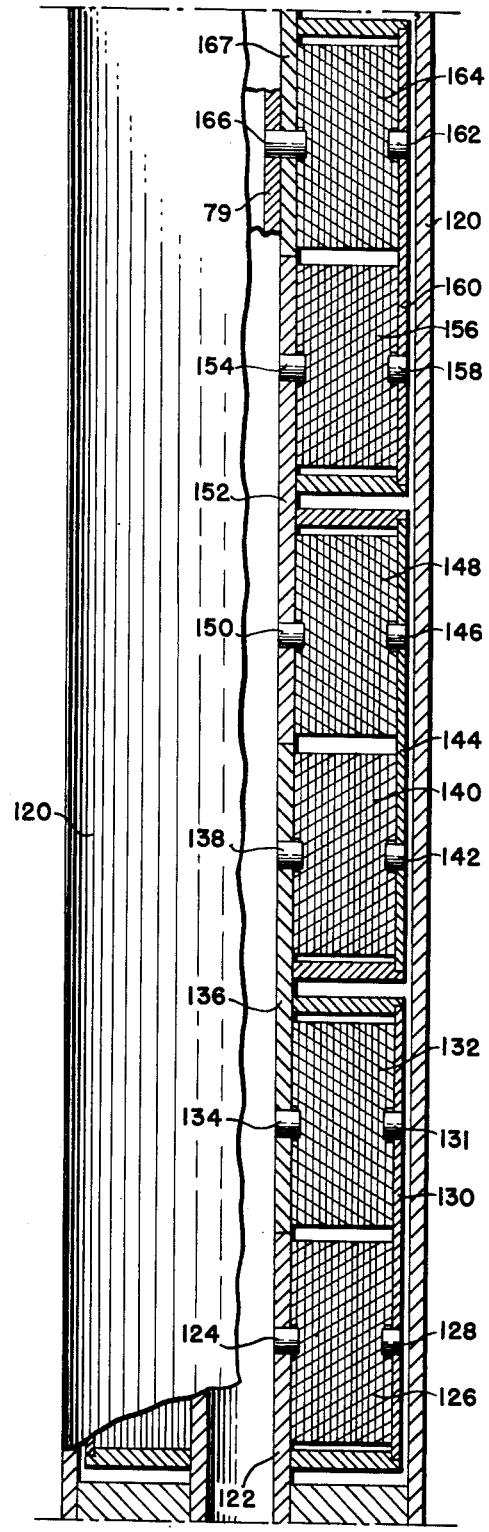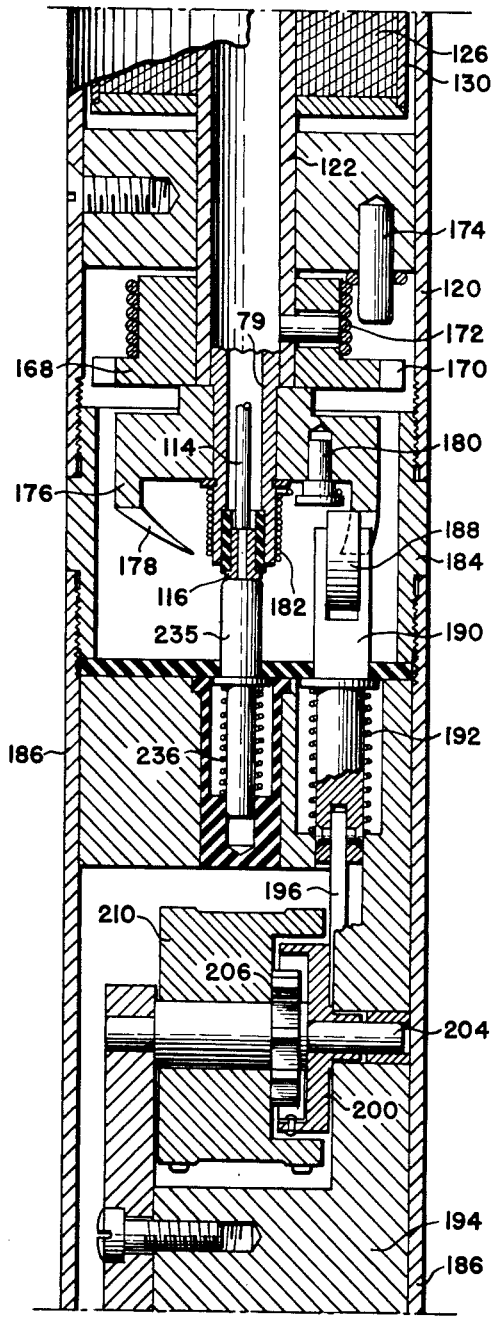
FIG. 1C.
FIG. 1D.
INVENTOR.
EINAR T. YOUNG
ATTORNEYS.

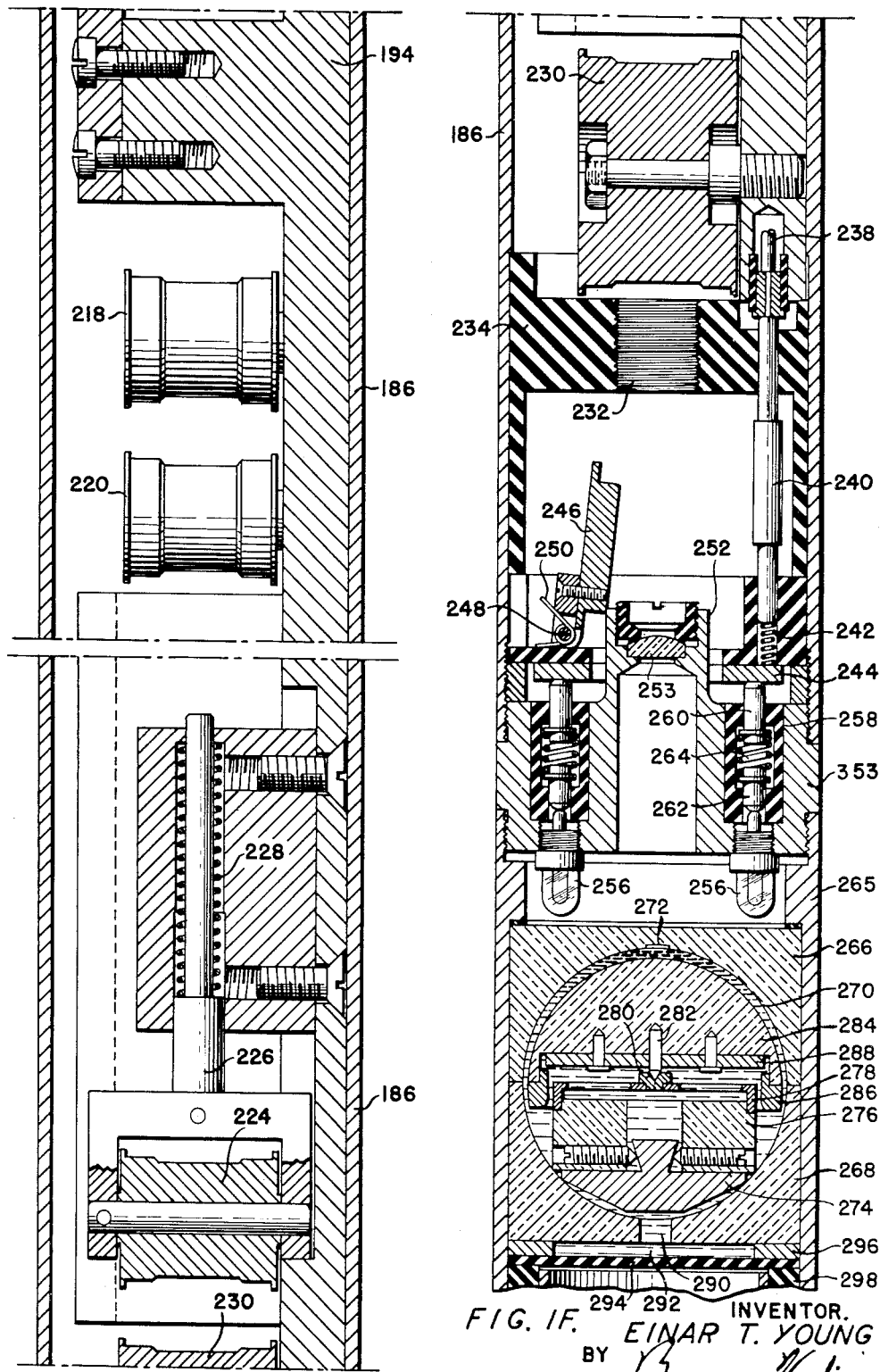

July 31, 1956   E. T. YOUNG   2,756,511
WELL SURVEYING INSTRUMENT
Filed Dec. 7, 1951   5 Sheets-Sheet 4

INVENTOR.
EINAR T. YOUNG
BY
ATTORNEYS.

INVENTOR.
EINAR T. YOUNG
BY
ATTORNEYS.

United States Patent Office 2,756,511
Patented July 31, 1956

2,756,511

WELL SURVEYING INSTRUMENT

Einar T. Young, Newtown Square, Pa., assignor to Sun Oil Company, Philadelphia, Pa., a corporation of New Jersey Application December 7, 1951, Serial No. 260,469

4 Claims. (Cl. 33—205.5)

This invention relates to well surveying instruments of the multiple shot type capable of providing a "continuous" survey of a bore hole or a portion thereof.

Multiple shot well surveying instruments have been in common use for the purpose of determining the inclination and direction of inclination of bore holes at spaced points along their lengths, the spacings of the points being such as to provide effectively continuous information so that the course of the bore hole may be accurately determined. Instruments of this type have been run in various fashions, on wire lines or by attachment to drill stems, in order to provide the desired surveys. Generally, however, they have not been applicable to the making of surveys concurrently with drilling operations: in other words, drilling has had to be interrupted to the extent that the drill stem has had to be removed from the hole prior to making the survey. The present invention relates particularly to the making of a survey during the period of removal of a drill stem from a hole such as is necessary in any event for the purpose of changing bits. Specifically, in accordance with the present invention, drilling is carried out to the condition requiring change of a bit. The drill stem is provided with a non-magnetic drill collar. The instrument of the present invention is go-deviled through the drill stem into the non-magnetic drill collar and then, as the drill stem is removed from the hole, records are made of both inclination and direction.

An attempt to survey a hole in this fashion with an instrument controlled from the surface would be impossible because of the fact that a cable cannot extend through the drill stem sections during removal of the drill stem since separation of the usual fourble lengths would be impossible. Various multiple shot well surveying instruments are known which are self-contained and include timing devices for the purpose of making records, by photographic exposure, or otherwise, at predetermined time intervals. Such instruments also involve the disadvantage that records are made at predetermined times whether or not they are desired at such times. Obviously, under such conditions, it is necessary to keep a record at the surface of the times at which exposures would be made and insure the proper lengthwise positions of the drill stem at such times and also insure that the drill stem is then stationary. The result of this type of operation is not only delay in waiting for the exposures to be made but also very considerable waste of photographic film or paper due to the making of numerous exposures while the drill stem is in motion so that the records cannot be valid.

In accordance with the present invention, these difficulties are overcome by providing a self-contained instrument with a control which is highly insensitive to lengthwise or transverse movements of the drill stem but is sensitive to rotary accelerations thereof. Through the use of such a control the cycle of recording is initiated either by starting or terminating rotation of the drill stem. Following initiation of the cycle, a sufficient time is permitted to elapse for the drill stem to be brought to a stationary condition and for the inclination and direction sensitive elements to come to rest. An exposure is then made, there being noted the depth at which the exposure occurs. As a result of this type of operation there is little waste of photographic film or other recording material and delays are minimized since, in general, the rotations which produce records are those which, in any event, would be involved for the separation of the various drill stem sections as the stem is withdrawn from the hole.

The general object of the invention will be evident from the foregoing and comprises the attainment of the results just indicated.

A further object of the invention is the provision of a well surveying instrument which has a very small diameter so that it may be dropped through a small size drill stem.

Still another object of the invention is to provide an instrument of the small size just indicated which, nevertheless, has a capacity for making a large number of records. For example, in the case of the instrument which will be described, it is possible to make easily upwards of two hundred exposures on sixteen millimeter film with an internal instrument having a diameter of only thirty-five millimeters. This interior instrument, of course, must be enclosed in a strong protective casing which adds diameter but nevertheless the entire instrument may be such as to pass through even the smallest size drill stems in common use.

In order to provide a large number of exposures, as just indicated, in a self-contained instrument, it is obvious that adequate power must be provided for the repeated operation of the mechanical parts involved in control of the exposures and advance of the film. A further object of the invention relates, therefore, to the provision of mechanical power means of very compact nature but providing sufficient total energy for all of the operations required. Inasmuch as the mechanical power is supplied by a spring arrangement, the instrument, which is preferably of photographic type, is required to carry batteries only sufficient to furnish the illumination for the photographic exposures.

The invention also has as an object the provision of a means highly sensitive to rotary acceleration but highly insensitive to translational movements of the drill stem either along or transverse to its axis.

The foregoing objects and other objects particularly relating to details of construction and operation will become apparent from the following description, read in conjunction with the accompanying drawings, in which:

Figures 1A, 1B, 1C, 1D, 1E and 1F are axial sections taken in order from the uppermost to the lowermost portions of an instrument provided in accordance with the invention;

Figure 2:
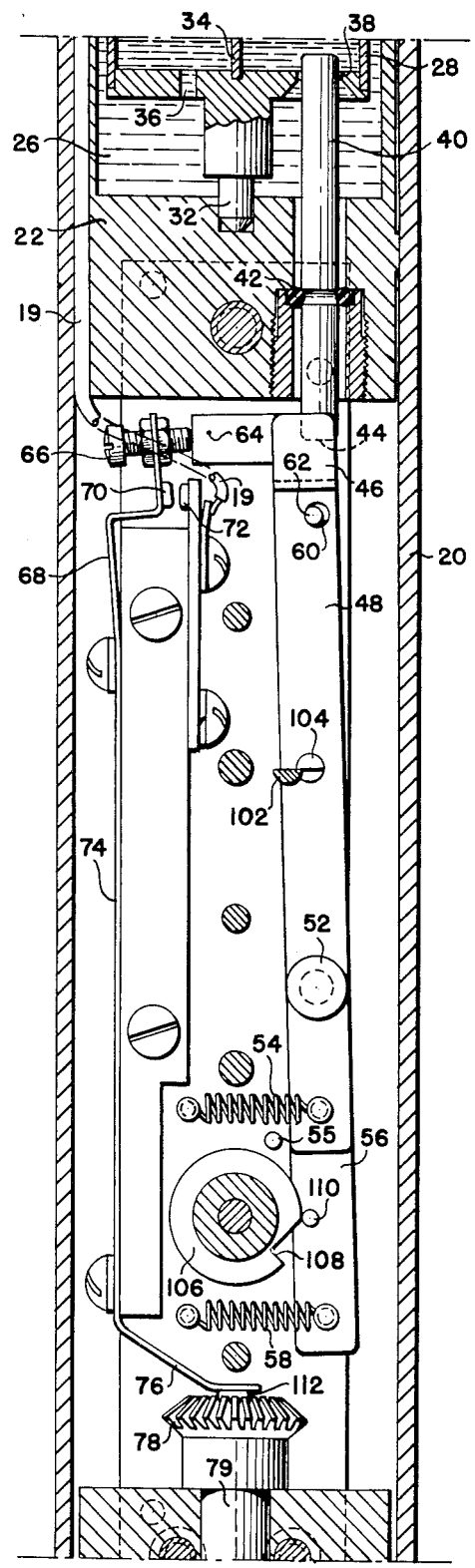
Figure 2 is an axial section taken approximately at right angles to the sections shown in Figures 1A and 1B and showing certain of the parts which are also shown in Figures 1A and 1B.

The drawings illustrate only the internal parts of the well surveying instrument, it being understood that the assembly illustrated will be located in a pressure-resistant protective casing for insertion through the drill stem. Since such protective casings, provided with the usual shock-absorbing arrangements, are well known, they will not be described herein. As will become evident from the description of the operation hereafter, a non-magnetic drill collar will be so constructed and arranged as to cooperate with the protective casing to locate it near the bottom of the drill stem in axial alignment with the drill stem. It may also be here noted that, since the instrument is of magnetic type, it is necessary not only to provide a non-magnetic drill collar but also to provide a protective casing of non-magnetic material with the constructions of both such as to remove from the influence of the bit and portions of the drill stem, which are of magnetic material, the sensitive direction element which involves a magnetic compass. The portions of the instrument shown in the drawings are also non-magnetic except, possibly, for minor parts which are quite substantially removed from the compass element.

Referring first to Figure 1A, there is indicated at 2 a tube, the upper portion of which is not shown, which is adapted to contain the batteries required to illuminate the lamps for the purpose of making exposures. These batteries 4 are stacked in usual fashion in series to provide the desired supply voltage and the positive pole of the uppermost battery is arranged in conductive relationship with a closure plug, not shown, in usual fashion to ground it to the housing including the tubular section 2 and the other tubular sections which are connected together by means of plugs, these various tubular sections and plugs being of conductive material.

The metallic casing of the lowermost battery 4 engages the plate 10 against which there abuts the spring 12 to drive downwardly the hollow pin 14 which is slidable in the insulating insert 8 in the coupling 6. The lower end of pin 14 engages a contact button 16 which is connected to an insulated wire indicated at 19.

The next housing tube 20 contains a metallic chamber 22 which is closed by a plug 24 in an arrangement providing a liquid-tight seal by reason of the O-ring 25. The resulting chamber 26 contains a hollow cylindrical member 28 supported by trunnions at 30 and 32 in bearing sockets in the cap 24 and cup 22, respectively, the axis of member 28 being coincident with the axis of the instrument. Within the hollow cylindrical member 28 there is a radially extending transverse baffle 34 which effectively divides the member 28 into two semicircular chambers. These chambers are opened to the interior of chamber 26 through openings such as indicated at 36. The chamber 26 and the interior of member 28 are filled with mercury to provide inertia as hereinafter more fully pointed out.

Projecting into an opening 38 in the lower end wall of the member 28 is a rod 40 which is supported in an opening in the cup 22 by an O-ring 42 which provides not only an effective pivot for rod 40 but also seals the arrangement against loss of mercury. As will become apparent, the rod 40 is required to have only a slight oscillating movement with respect to cup 22 when the member 28 moves rotatably relative to this cup.

The lower end of rod 40 enters a fork provided by the turned upper end 46 of a leaf member 48 and an angle 50 secured thereto. The leaf 48 is pivoted at 52 to a fixed supporting member forming part of the housing but is sufficiently flexible to have at its end 46 a movement toward the right as viewed in Figure 1A. However, the lower end of rod 40 is free for relative movement with respect to the fork arrangement in a direction to the right or left, as viewed in Figure 2. A spring 54 normally urges the leaf 48 in a clockwise direction, as viewed in Figure 2. Also pivotally mounted at 52 to the rear of the leaf 48, as viewed in Figure 2, is a lever 56, which is normally urged in a clockwise direction, as viewed in Figure 2, by a spring 58. The leaf 48 is provided with an opening 60 which embraces with clearance a pin 62 carried by the lever 56. At its upper end lever 56 carries an insulating block 64 engageable by an adjustable screw 66 threaded into the upper end of a thin leaf member 68 which carries an electrical contact point 70 arranged to engage at proper times a cooperating fixed contact point 72 which is electrically connected to the insulated wire 19. The extension 74 of leaf 68 is secured to the framework and its lower end 76 provides electrical contact with a button 112 which will be hereafter referred to.

A bevel gear 78 is carried by a tubular shaft 79 and meshes with a similar bevel gear 80 which is mounted on an axis transverse to the axis of the instrument. These gears provide the initial gears of a series arranged in clockwork fashion and comprising gear 82, pinion 84, gear 86, pinion 88, gear 90, pinion 92, gear 94 and pinion 96, the last being secured to the escape wheel 98 with which cooperate the arms of a pallet 100, the pallet being of substantial inertia so that, as it oscillates, it controls the rotation of the escape wheel. The arrangement is essentially a clockwork train which controls slow rotation of the pinion 84 and its shaft which carries a cam 106.

The escape wheel 98 is provided with a semicircular pin 102 which is arranged to cooperate with, and be stopped by, a similar semicylindrical pin 104 carried by the leaf 48.

The cam 106 has the shape shown in Figure 2 and, in particular, is provided with a notch portion 108. There rides on the cam, under the action of spring 58, a pin 110 carried by lever 56.

The cam 106 makes a complete revolution for each quarter revolution of shaft 79 and provides a one-revolution arrangement as follows:

When, due to relative rotation between member 28 and the instrument housing to which the cup 22 is fixed, the lower end of rod 40 moves toward the right, as viewed in Figure 1A, the leaf 48 is moved to the right so that its opening 60 is disengaged from pin 62. Spring 54 then rocks the leaf 48 clockwise, as viewed in Figure 2, to an extent limited by the stub pin 55. The result is to disengage the stop pin 104 from the pin 102 carried by the escape wheel 98. The escape wheel 98 is thus freed for movement by the shaft 79 under spring action, as hereafter described, and cam 106 will then rotate clockwise, as viewed in Figure 2. As indicated in this figure, in initial position, pin 110 engages the outer circumference of this cam under the action of spring 58 so that block 64 by pressure against screw 66 disengages contacts 70 and 72. The cam continues to rotate and, eventually, after a substantial delay determined by the operation of the clockwise train, the pin 110 will drop into the notch 108. When this occurs, spring 58 will rock lever 56 clockwise permitting engagement of contact 70 with contact 72 to complete the electrical circuit. At the same time, the pin 62 will move toward the right, as viewed in Figure 2, to come into alignment with opening 60 in leaf 48 with the result that the leaf 48 will spring toward the lever 56, causing opening 60 to embrace again the pin 62. The cam 106 will continue to rotate, causing the pin 110 to be moved toward the right, as viewed in Figure 2, with consequent counterclockwise movement of lever 56, and with it, leaf 48 by reason of the engagement of pin 62 in opening 60. The result is to break the electrical circuit and to bring stop pin 104 into the path of pin 102 to stop the rotation of the clockwork train. Thus, the initially described movement of rod 40 provides a single revolution of cam 106 and a quarter revolution of shaft 79.

The button 112, previously described, is connected by an insulated wire 114 to a button 116 at the lower end of the hollow shaft 79.

The shaft 79 is mounted in the coupling member 118 which connects tube 20 to the next lower tube 120 which houses the spring motor for driving the shaft. Surrounding the lower exterior of shaft 79 is a tubular shaft 122 which is provided with a pin 124 forming an anchor for the inner end of a spiral leaf spring 126, the outer end of which spring is anchored by pin 128 to a tubular element 130. The tubular element 130 has a pin 131 fixed therein providing the anchor for the outermost convolution of a second spiral leaf spring 132, the inner end of which is anchored to a pin 134 secured in a second tubular shaft section 136. Further spiral springs 140, 148, 156 and 164 are connected in series in the same general fashion as springs 126 and 132, these springs being provided with inner anchor pins 138, 150, 154 and 166 and outer anchor pins 142, 146, 158 and 162. As will be evident from the drawing, pins 134 and 138 are carried by the hollow shaft section 136, and pins 150 and 154 are carried by the hollow shaft section 152. Pins 142 and 146 are carried by sleeve 144 and pins 158 and 162 are carried by sleeve 160. The pin 166 is not only connected to the sleeve section 167 but also to shaft 79.

As will be evident from the foregoing, all of the springs described are connected in series, the result being that of a large spiral spring but with the provisions of an arrangement which is encompassed in a quite small diameter.

A greater or lesser number of springs may be thus provided depending upon requirements. It may be noted that in a well surveying instrument, it is generally relatively immaterial how long it may be and, consequently, parts may be extended axially to any desired extent for the purpose of conserving diameter.

The lower end of shaft section 122 must, of course, be arranged so that the springs may be wound and also so as to provide a fixed anchor for the lowermost spring 126. To this end, there is secured to the shaft 122 a member 168 provided with teeth 170 which may be engaged by cooperating teeth on a winding member inserted into the lower end of tube 120 when this is disengaged from lower portions of the instrument. To provide a fixed anchorage and, yet, permit free winding, a simple overrunning clutch arrangement is provided by a helical spring 172 which is so formed as normally to engage tightly the cylindrical portion of member 168. The upper end of this spring is secured to a fixed post 174. When the member 168 is rotated in winding direction, this direction in conjunction with the direction of the helix of spring 172, is such that the spring will tend to be unwound releasing the member 168 for free winding rotation. However, when winding is completed and the tendency of the power springs will be to rotate the member 168 in the opposite direction, it will tend to tighten the helical spring 172 and will thus be gripped and held fixed. The energy stored in the springs is, accordingly, available to drive the shaft 79.

In addition to controlling the illumination for the photographic exposures, the shaft 79 must impart by its rotation feeding movements to the photographic film. To this end, there is journalled on the lower end of shaft 79 a cam member 176 provided with four cam rises, indicated at 178, between which are located sockets. A pin 180 is secured in the member 176 and has anchored to it one end of a helical spring 182 which provides an overrunning clutch by reason of its being in tight engagement with the lowermost end of shaft 79. The overrunning clutch arangement is provided in order that upper and lower portions of the instrument may be assembled by the threading of a coupling member 184 into the lower end of tube 120. If it were not for this overrunning arrangement, a follower, as will presently appear, would not be properly timed with respect to cam 176 when assembly was completed. The arangement is such that, when the coupling member is threaded into the tube 120, the cam follower shown at 188 in Figure 1D will engage within one of the cam sockets and will freely rotate the cam with respect to shaft 79 by causing uncoiling of spring 182. On the other hand, when drive of cam 176 occurs, the spring will be tightened up to provide a tight interrelationship between shaft 79 and cam 176.

Figures 3A, 3B:
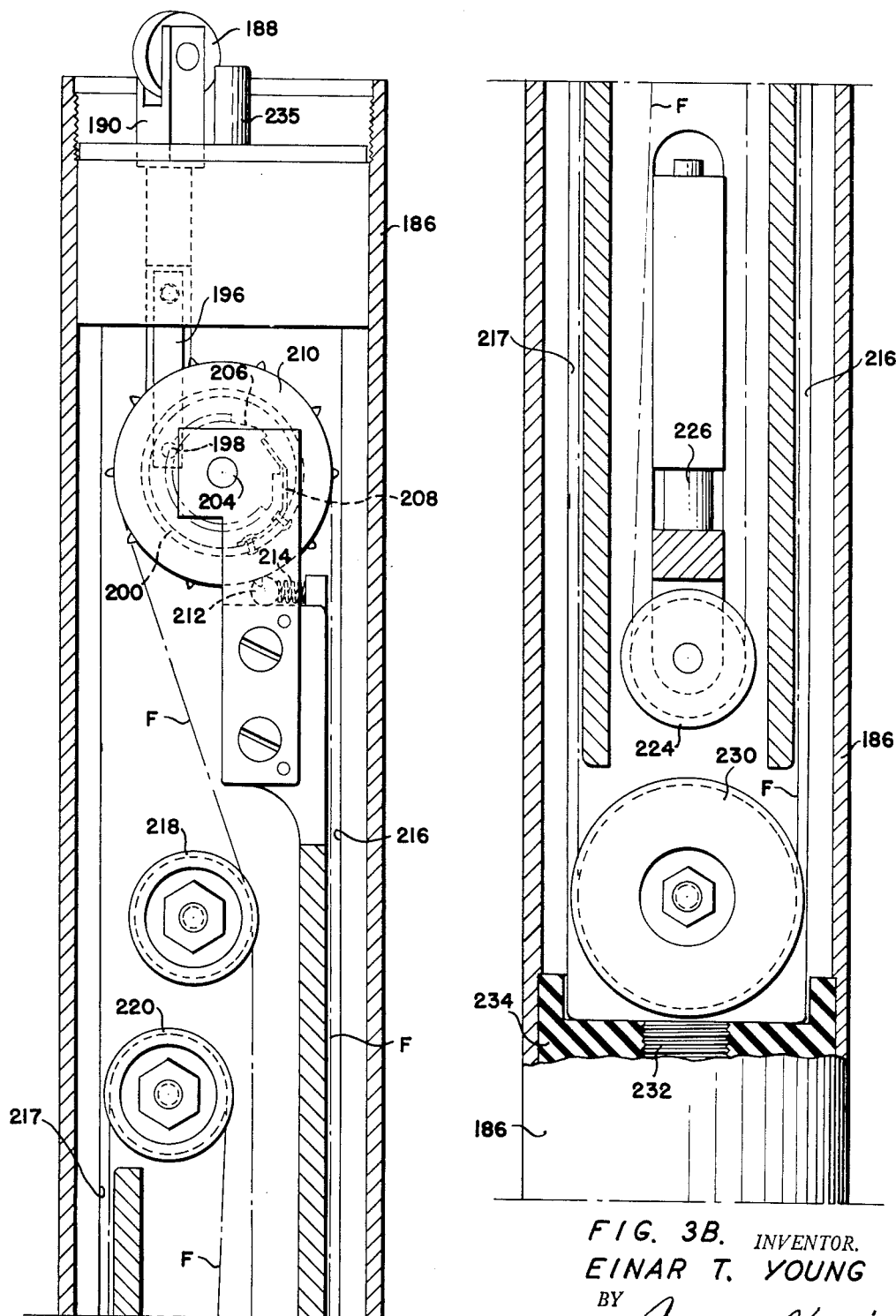
Figures 3A and 3B are successive sections taken axially at substantially right angles to the sections 1D and 1E to illustrate further various parts thereof.

Threaded to the lower end of coupling 184 is a tube 186 which provides a housing for the photographic film and which, accordingly, must be light-tight. The cam follower roller 188 is carried by a slide 190 which is urged upwardly by a spring 192. Pivoted to this slide is a link 196 which is, in turn, pivoted to an oscillating member 200 at pivot point 198, the member 200 being journalled on a shaft 204 which carries a ratchet 206 arranged to be advanced by a spring pawl 208 carried by the member 200. Secured to ratchet 206 is the film feed sprocket 210. As will be evident, the rotation of cam 176 will produce oscillations of the member 200 to advance the sprocket 210 step by step. Reverse movements of this sprocket are prevented by a ball-type detent 212 bearing on the periphery of the pinwheel under the action of spring 214. The sprocket advance is in a counterclockwise direction, as viewed in Figure 3A.

The film F is trained in zigzag fashion through the tube 186 by the provision of guideways 216 and 217, which, in particular, prevent fogging of portions of the film not being exposed during the making of a particular exposure, and by reason of the provision of pulleys 218 and 220 which rotate on fixed axes, pulley 224 which is movable to tension the film by reason of its being carried by a plunger 226 urged downwardly by spring 228, and by pulley 230 over which the film is trained adjacent to the aperture 232 in a member 234 which closes the lower portion of the tube 186. As will be evident from the drawings, the film is provided in the form of an endless band trained about the sprocket and pulleys just mentioned in order to secure a maximum length in a minimum length of the instrument. It will, of course, be evident that by suitable choice of length of the film chamber any desired amount of film may be incorporated therein. As will be particularly clear from Figures 1D, 1E and 1F, by slipping the interior assembly from the tube 186, the film may be readily loaded in a dark room. The film passes over pulley 230 at the position where it is to be exposed through opening 232. The film thus presents a cylindrical surface to the projection of the sensitive elements of the instrument.

A metallic coupling member 353 is threaded into the lower end of the tube 186 and provides a support 252 for a centrally located lens 253 which, as will appear hereafter, projects an image of the indicating element on the film strip. The lens 253 is a small aperture lens and has sufficient depth of focus that the focus is sharp over the entire field.

In order to conduct current from the batteries and switch to the lamps 256, there is provided a plunger 235 in an assembly of insulation urged by a spring 236 to engage the button 116 at the lower end of the shaft 79. From this spring, there extends a wire, which is not shown throughout its full extent, but which is indicated at 238 at its connection with an insulated conducting assembly at 240 from which the current is conducted through a spring 242 to the conducting plate 244.

In the coupling member 353 there are provided insulating tubes 258 which receive pins 260 and 262 urged outwardly by springs 264 to provide electrical contacts with central contacts of lamps 256, threaded bases of which are threaded into openings in coupling member 353 to provide ground connections.

In order that the instrument may be handled in daylight and, in particular, so that it may be disassociated from the inclination-direction indicating assembly, there is pivoted at 248 to the insulating assembly at the lower end of tube 186 a light trapdoor 246 which is normally urged closed by a spring 250 but which is forced open to clear the optical path by the projection 252 on the upper end of the coupling 353 of the inclination-direction and optical assembly.

Below the lamps 256 there is provided a direction-inclination unit. This comprises a pair of transparent members 266 and 268, desirably of glass (though they may be of metal, the upper one being provided with a glass window), which are clamped together within tube 265 and provide a spherical chamber indicated at 270 at the top of which in the axis of the instrument there is inscribed a reference marking at 272, for example, consisting of a small circle with a cross therein. Within the spherical chamber there is located a counterweight, indicated at 274, the lower surface of which is of frustoconical shape, as indicated in the drawing. Desirably, the circular edge at the large end of the frustum is arranged to engage and rest on the spherical inner surface of the chamber while the circle at the smaller end of the frustum just clears this surface. Mounted on the counterweight 274 is the bearing support member 276 which is provided with centering screws for engagement with the counterweight to provide adjustment of the bearing support member with respect to the counterweight.

A bearing mount 278 is secured to the bearing support 276 by an annular flange and has a thin metal portion extending across the bearing support and desirably provided with large openings so as to have a slight springing action, this portion of the member 278 clearing the bearing support at its center so that it may flex slightly downwardly. At its center the member 278 carries the jewel socket 280 for the reception of the pointed end of the pin 282 secured in the hemispherical float 284 which at its lower portion carries a counterweight ring 286. Secured to the float 284, for example by pins, is a compass needle 288. The spherical chamber 270 is filled with a suitable liquid having a substantial buoyant action on the elements within the chamber. At its lower end the chamber 270 communicates with a central opening 290 leading to a space 292 above a flexible diaphragm 294 which is spaced from the member 268 by a spacing ring 296 against which it is pressed by the gasket 298 by a plug and retaining assembly mounted in the lower end of the tube 265 in a conventional fashion and not shown. Thus the chamber 270 is held in fixed position with respect to the optical system of the instrument.

The assembly, comprising the hemispherical float 284, the ring 286, the pin 282 and the compass needle 288, is constructed with respect to the liquid in the chamber 270 in which it is immersed so that its effective specific gravity is only slightly greater than that of the liquid. Its effective center of gravity is directly below its center of buoyancy so that, when the instrument is vertical, the axis of the indicating element is also precisely vertical. (By effective center of gravity there is meant the apparent center of gravity with the compass needle magnetized, this being slightly different from the true center of gravity with the needle unmagnetized.) This direction-inclination unit is more fully described in my copending patent application, Serial No. 143,072, filed February 8, 1950, now Patent No. 2,616,187, issued November 4, 1952.

As more fully described in the above mentioned copending patent application, the hemispherical surface of the member 284 may carry markings which, when they assume positions with respect to the reference circle 272, will be indicative of inclination and the direction of inclination of the instrument. This surface is adapted to be illuminated by means of the lamps 256 and an image thereof projected by the lens 253 upon the film strip which is carried by the pulley 230.

In operation, the well surveying instrument may be run go-devil fashion through a drill stem into a non-magnetic drill collar which is positioned adjacent to the drill bit in a conventional fashion. Prior to the dropping of the instrument into the drill stem, the clockwork mechanism will have been wound by the insertion of the key into engagement with the gear 170 and a film strip will have been loaded into the instrument through the lower end of the sleeve 186 as has been previously described. The assembled instrument as it passes downwardly through the bore hole is maintained in an inoperative position by means of engagement of the pin 102 of the clockwork mechanism against the pin 104 of the release mechanism.

As the instrument passes downwardly through the drill stem, the drill stem is not rotated, and thus, while the instrument will be subjected to both longitudinal and transverse shock during its passage downwardly through the drill stem, it will not be subjected to rotation. The hollow cylindrical member 28 being relatively insensible to longitudinal or transverse shock retains its position with respect to the instrument casing and the trip rod 40 also remains stationary.

When the instrument is seated in the bottom of the drill stem and the lower end of the drill stem is positioned in the bore hole in a location at which measurements of inclination are desired, the drill stem is rotated and the inertia of the mercury contained within the member 28 acting against the transverse baffle 34 causes the member 28 to rotate with respect to the instrument casing. This rotation of the member 28 will move the lower end of the trip rod 40 to the right, as viewed in Figure 1A, disengaging the leaf 48 from the pin 62 and permitting the spring 54 to rock the leaf 48 clockwise about the pivot 52 disengaging the stop pin 104 from the pin 102 carried by the escape wheel 98. The clockwork mechanism will now proceed to run until the stop pin 102 again engages the pin 104.

Operation of the clockwork mechanism will drive the cam 106. The pin 110 on the leaf 48 is held in engagement with the surface of the cam 106 by means of the spring 54. When the pin 110 drops into the notch 108, the plug 64 is moved away from the screws 66 permitting the contacts 70 and 72 to close, thus completing the circuit from the battery 4 to the lamps 256 and providing illumination for the hemispherical member 284 for a time interval as determined by the peripheral length of the notch 108 on the cam 106. At the expiration of this time period, the pin 110 is moved to the right, as viewed in Figure 2, by the operation of the cam 106 and contacts 70 and 72 are opened.

During the period of time when the pin 110 is riding on the outer surface of the cam 106, the contacts 70 and 72 are opened and the lamps 256 are extinguished, one of the cam rises, indicated at 178 in Figure 1D, is depressing the cam follower 188 and actuating the ratchet mechanism 200 and 206 in order to advance the film carried by the film sprocket 210 a sufficient distance to position an unexposed portion of the film passing over the roller 230, shown in Figure 1F, in alignment with the aperture 232 through which there is to be projected by means of the lens 253 an image of the hemispherical surface 284 when the lamps 256 are illuminated.

As previously described, when the pin 110 drops into the notch 108 in the cam 106, the pin 62 in the leaf 56 will engage the hole 60 in the leaf 48 and thus, as the pin 110 is cammed out of the notch 108, the pin 104 on the leaf 48 is carried to the left, as viewed in Figure 2, and thereby positioned so as to be engaged by the pin 102 on the escapement mechanism of the clockwork timer. Thus, after a cycle of operation whereby the film is advanced to a new position and a portion of the photographic film is exposed for a predetermined length of time, operation of the clockwork mechanism is arrested and remains arrested until again initiated by the tripping mechanism which is relatively insensible to either longitudinal or transverse motion and which is highly responsive to rotational motion of the drill stem.

It will be observed by viewing Figure 2 that the various portions of the apparatus are so constructed that the operation of the clockwork mechanism is arrested almost immediately after the pin 110 is moved out of the notch 108 in the cam 106. This is desirable in that, upon initiation of the new cycle of operation, the film strip is first advanced and the film exposure is made substantially at the end of the period of operation. There is accordingly provided a maximum time interval from the time of the initiation of the instrument by means of drill stem rotation until the photographing of the floating compass member in order to insure that the floating compass member has come to rest before the photograph is made.

It will be evident that, by means of this apparatus, a large number of surveys may be made throughout the length of the bore hole as the drill stem is being removed therefrom. The mechanism disclosed for initiating the apparatus in response to rotation of the drill stem provides a convenient method of control, and the insensitivity of this portion of the apparatus to longitudinal or transverse motion provides a relatively foolproof control mechanism.

The spring motor drive mechanism, shown in Figure 1C, makes possible the provision of a clockwork timer which will operate over a considerable period of time while occupying a minimum of diametrical space, this dimensional requirement being a strict requirement in this type of apparatus.

The various exposures made by the apparatus may be readily correlated to the depth within the hole at which the survey is made by measurement of drill stem length which is easily and accurately made. The various surveys are recorded successively on the photographic film which may be easily removed from the apparatus and then developed in the conventional manner.

It will be evident that various modifications may be made in the details of the embodiment of the invention disclosed herein without departing from the scope of the invention as set forth in the following claims.

What is claimed is:

1. Well surveying apparatus comprising means indicating a condition within a bore hole, means for illuminating said indicating means, a light sensitive strip, means for directing an image of said indicating means on a portion of said strip when said indicating means is illuminated, means for moving said strip a predetermined length, means for energizing said illuminating means, and means responsive to rotation of said apparatus for first actuating said means for moving said strip the predetermined length and, after the strip has completed its movement, actuating said means for energizing said illuminating means, said rotation responsive means including a rotatably mounted member having a substantially transversely positioned interior baffle and containing a fluid material.

2. Well surveying apparatus comprising means for recording a condition within a bore hole and means for actuating said recording means, said last mentioned means including a movably mounted flexible member, urging means operatively connected to said flexible member urging movement thereof, releasable means restraining motion of said flexible member, said releasable means being released upon flexure of said flexible member, and means responsive to rotation of said apparatus for flexing said flexible member to release said releasable restraining means to permit motion of said member by said urging means.

3. Well surveying apparatus comprising means for recording a condition within a bore hole and means for actuating said recording means, said last mentioned means including a pivotally mounted flexible member, means urging rotation of said flexible member about its pivot, releasable means restraining rotation of said flexible member, said releasable means being released upon flexure of said flexible member, and means responsive to rotation of said apparatus for flexing said member to release said releasable restraining means to permit rotation of said member about said pivot by said urging means.

4. Well surveying apparatus comprising means indicating a condition within a bore hole, means for illuminating said indicating means, a light sensitive strip, means for directing an image of said indicating means on a portion of said strip when said indicating means is illuminated, a first movable member, a second movable member, urging means operatively connected to each of said members, means controlling the position of said first member, latch means restraining motion of said second member with respect to said first member, means responsive to rotation of said apparatus for releasing said latch means, means responsive to motion of said second member by said urging means after release of said latch means for moving said strip a predetermined length and for actuating said first member position controlling means, and means responsive to motion of said first member by said urging means and said first member position controlling means for energizing said illuminating means for a predetermined time interval, for reengaging said latch means, and for repositioning both of said movable members.

References Cited in the file of this patent

UNITED STATES PATENTS

| 1,328,402 | Schiffl | Jan. 20, 1920 |
| 1,910,720 | Tarlton | May 23, 1933 |
| 1,981,665 | Rieber | Nov. 20, 1934 |
| 2,103,235 | Conrad | Dec. 28, 1937 |
| 2,109,690 | Culbertson | Mar. 1, 1938 |
| 2,195,224 | Opocensky | Mar. 26, 1940 |
| 2,313,168 | Opocensky | Mar. 9, 1943 |
| 2,396,869 | McDonald et al. | Mar. 19, 1946 |
| 2,559,373 | Ring | July 3, 1951 |
| 2,572,332 | Goodwin | Oct. 23, 1951 |
| 2,584,983 | Butterworth | Feb. 12, 1952 |
| 2,620,712 | Clifford | Dec. 9, 1952 |

FOREIGN PATENTS

| 11,628 | Great Britain | 1908 |
| 351,745 | Great Britain | July 2, 1931 |